Feb. 16, 1943.   W. S. MASON   2,311,557
PISTON RING
Filed Dec. 9, 1941

Inventor
William S. Mason
Atty.

Patented Feb. 16, 1943

2,311,557

UNITED STATES PATENT OFFICE 2,311,557

PISTON RING

William S. Mason, Norfolk, Va.

Application December 9, 1941, Serial No. 422,193

4 Claims. (Cl. 309—44)

This invention relates to piston rings and more especially to packing rings applicable for use in the cylinders of internal combustion engines.

Another object is to provide an improved ring of the type that utilizes integral radially resilient means for urging its periphery against the wall of the cylinder. One such ring is disclosed in the patent to W. I. McGinniss, 1,288,085, dated December 17, 1918. In addition to its simplicity, a ring having integral spring means for supplementing its inherent radial expansibility has a particular advantage over a packing ring if an additional expander ring is used, that is the springs being an integral part of the ring are provided with a good heat path to the comparatively cool cylinder wall, therefore have less tendency to overheat and lose their radial expansiveness when the ring is used in the cylinders of modern high speed high compression internal combustion engines. In the structure disclosed in the McGinniss patent tongues have been struck from the inner periphery of the ring. The free ends of the tongues seat on the bottom of the groove in the piston and the opposite ends serve as connectors and take all of the bending strain. In the structure disclosed in the present invention spring fingers are used to supplement the radial expansibility of the ring and they are formed and arranged with both of their ends seated on the ring, thus increasing their radial expansiveness and reducing bending strain at their point of connection to the ring.

Several further objects are to provide a ring which can be used in any groove of a piston; to provide a ring which is easy to install and which will have an extremely long useful life; to provide a ring having oil scraping means.

Additional objects and advantages will be brought out in the following description and claims wherein they will be more readily understood when read in conjunction with the accompanying drawing; in which:

Figure 1:
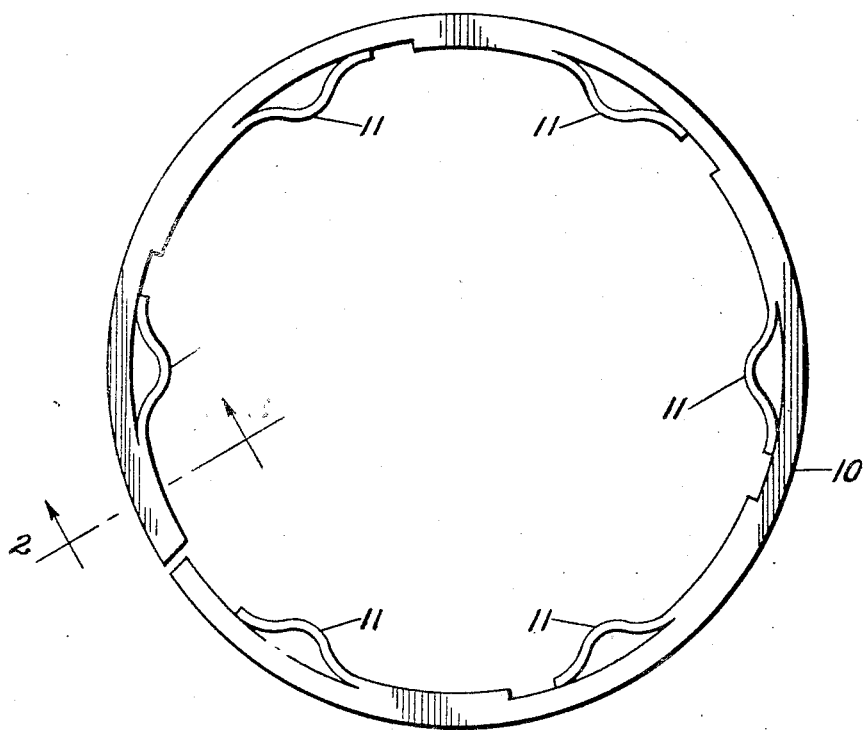
Figure 1 is a top view of a ring constructed according to the present invention.
Figure 2:
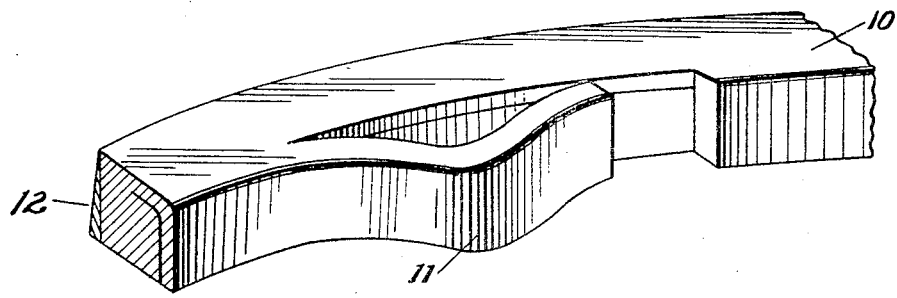
Figure 2 is a fragmentary perspective view on the line 2—2.

The piston ring 10, shown in the drawing comprises an annular band having its inner periphery provided with radially expansible spring fingers 11. The ring is constructed principally for use as a compression ring, and as such rings, especially when used in modern high compression engines, tend to overheat they have been designed to have when worn in nearly all of their peripheral sealing and scraping surface in contact with the comparatively cool cylinder wall. The periphery of the ring has been provided with soft quick seating 12, tapered from its lower edge to its upper edge to decrease wearing in time of the ring, and to prevent the ring from scoring the cylinder wall during the wearing in period.

I claim:

1. For use in a cylinder in combination with a reciprocating piston provided with a packing ring groove, a radially expansible resilient metal split piston ring, said ring being substantially rectangular in shape and having its outer curved side formed and arranged to seal the wall of said cylinder and having its inner periphery provided with a plurality of elongated annularly extending radially expansible spring fingers, said spring fingers comprising an axially folded extension from the inner peripheral edge of said ring.

2. For use in a cylinder in combination with a reciprocating piston provided with a piston ring groove, a radially expansible resilient metal split piston ring having its inner periphery provided with radially expansible spring fingers and its outer curved side formed and arranged to seal the wall of said cylinder, said inner periphery comprising a relatively thin axially extending folded inner peripheral layer of the material of said ring and said spring fingers being formed therefrom and seated on the inner curved side of the ring.

3. For use in a cylinder in combination with a reciprocating piston provided with a piston ring groove, a radially expansible resilient metal split piston ring having its inner periphery provided with elongated annularly extending radially expansible spring fingers and its outer curved side formed and arranged to seal the wall of said cylinder, said spring fingers formed from an axially folded extension from the inner peripheral edge of said ring and having one end seated on its inner curved side.

4. The structure of claim 3, in which said piston ring has its outer curved side provided with a coating of metal which is relatively soft as compared to the metal of said piston ring, said coating being of greater radial depth adjacent to the lower edge of the ring than at the upper edge and tapering inwardly from said lower edge to said upper edge.

WILLIAM S. MASON.